Nov. 3, 1942.  A. AMIGO  2,300,759
INJECTION MOLDING OF SYNTHETIC MATERIALS
Filed Feb. 24, 1939  2 Sheets-Sheet 1

Inventor
A. Amigo
by Glascock Downing Seebold
Attys

Patented Nov. 3, 1942

2,300,759

UNITED STATES PATENT OFFICE 2,300,759

INJECTION MOLDING OF SYNTHETIC MATERIALS

Alfonso Amigo, London, England

Application February 24, 1939, Serial No. 258,308
In Great Britain February 11, 1939

7 Claims. (Cl. 18—30)

There are two different systems of molding synthetic materials. According to one system the material runs through all its physical states from the point of supply to the finished molding in one single zone, whilst, according to the other system the material runs through its various physical states in two zones. One example of the first system is the ordinary compression molding in open molds and the injection molding with a pressure chamber built in the mold. One example of the second system is the injection molding of thermoplastic materials with a separate pressure chamber and a separate mold cavity.

In order to be capable of being worked some materials require to be specially treated, even at the place or in the zone of supply, for instance, by using reduced pressures at low temperature, in order to prevent premature flow or stoppage in the passages before the proper temperature for rendering the material plastic has been reached. Hitherto this has been ensured mostly by stopping the injection plunger during its downward movement, an operation which is very inaccurate especially as it is dependent on the skill of the workman, and entails waste of time.

In the case of injection molding of thermo-hardening synthetic resins, the passages connecting the molding cavity with the pressure chamber are provided directly in the mold. The passages, however, do not always fulfil completely the main object of injection molding, which is to reduce the time of hardening as much as possible, this being mainly dependent on the proper heating of the mass flowing through the passages and thus open the length and cross-section of the latter. The relationships of these dimensions cannot be accurately predetermined when the mold is being designed and any changes that may be found necessary when the mold is used cannot be made as often as desired; moreover, such changes are often very costly and sometimes it is even impossible to carry them out.

Certain molding difficulties could not hitherto be overcome because of the heat exchange between the pressure chamber and the mold while the material flows through. For instance, the continual injection molding of thermo-hardening synthetic resins requires, like the injection of thermoplastic materials, that there should be a temperature difference between the pressure chamber and the mold which, however, should not be too great. During the period of injection, which lasts a relatively long time, the pressure chamber connected to the mold becomes inadmissibly highly heated and the injection material therein hardens, with the result that the flow of the material and the working of the machine are stopped.

A further great drawback of existing devices for injection molding is the connection of the pressure chamber on to the mold. This is mostly effected by means of a small, conical, spherical or flat contact surface, which constitutes the so-called nozzle. In order to produce a good tight fit the surface of contact must be as small as possible for a definite pressure. However, since it is the sole place of contact between the pressure chamber and the mold, it must take up the whole of the injection pressure in the case of movable pressure chambers, and the whole of the opposing mold pressure in the case of pressure chambers and of mold which are not self-locking. The very high specific pressures thereby produced on the surface of contact, which are much higher than is necessary for effecting a tight fit, strain the nozzle and cause it to wear rapidly. If the surfaces of contact are made larger in order to reduce the specific surface pressure, then the danger of affecting the tight fit is increased and, should in this case some of the material penetrate in between the surface of contact under the injection pressure, then the back pressure on the large surface of contact may cause the stresses on the various parts of the machine to become inadmissibly great.

The object of the present invention is to provide an improved process for shaping synthetic materials, more particularly for thermo-setting synthetic resins and apparatus therefor, which will avoid the drawbacks encountered with the processes and apparatus hitherto proposed.

According to the present invention there is interposed, between the supply part of the apparatus comprising the nozzle and the part comprising the mold cavity, an intermediate part comprising a channel or channels for the flow of the material from the supply part to the mold part, the said intermediate part being separate so as to be capable of being readily removed and exchanged for another intermediate part having a channel or channels of different dimensions. This intermediate part constitutes an intermediate zone and by its being removed and exchanged for another intermediate part enables the apparatus to be so adjusted that the material flowing through it and reaching the mold cavity will possess the required physical properties. At the same time care must be taken that the zones referred to be heat insulated from one another and this is ensured by interposing between the zones heat-insulating means capable of being displaced after each molding operation so as to bring fresh parts thereof in between the zones, each of the said fresh parts having a channel which will permit the flow of the material from one zone to the other.

Different forms of carrying the invention into effect are illustrated, by way of example, in the accompanying drawings, in which.

Figure 1:
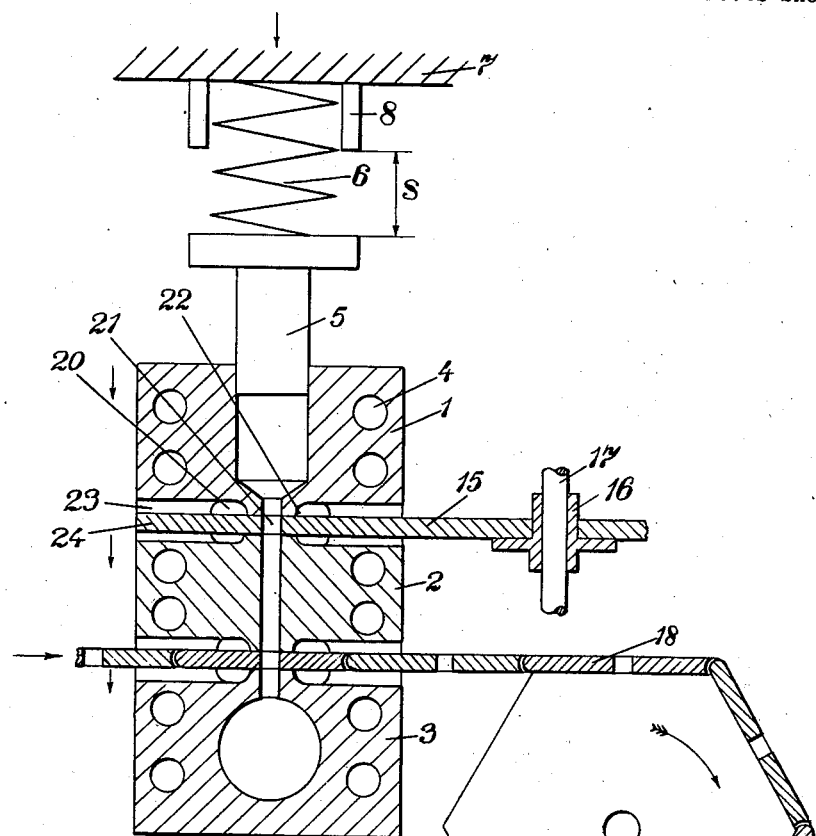
Fig. 1 is a sectional elevation of one form of construction.
Figure 2:
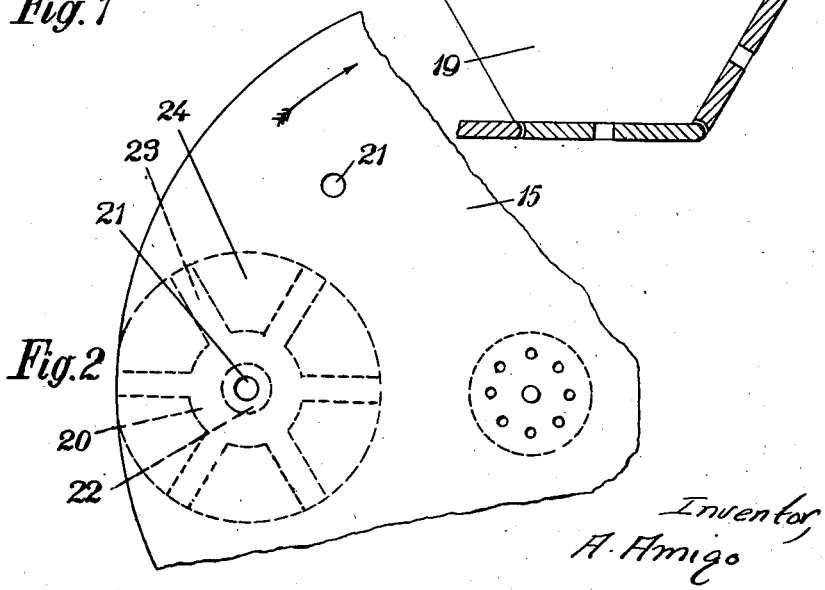
Fig. 2 shows in plan view part of the construction shown in Fig. 1.

Referring to Figures 1 and 2 showing an arrangement according to the invention, 1, 2 and 3 are the three parts constituting the three separate zones, viz., the zone of supply, the removable intermediate zone and the molding zone respectively. 4 are channels provided for the purpose of either heating or cooling the various zones so that the material supplied through 1, passing through 2 and molded in 3 may attain the best physical condition required in any particular case.

When use is made of thermo-setting synthetic resins, the temperature of zone 1 is so controlled that the material therein becomes plastic under pressure but does not harden; that of zone 2 is so adjusted that the material passing through it absorbs wholly or partly the heat necessary for hardening; and that of zone 3 is adjusted to have such a high value that the material hardens. When use is made of thermoplastic materials, the temperature of the zone 2 has to be slightly higher than that of zone 1, whilst zone 3 has to be cooled.

Instead of using one single intermediate zone, a plurality of such zones may be used in order to secure the best results as regards the physical condition of the particular material which is to be molded and thereby obtain the highest output.

By means of the piston 5 the material is subjected in zone 1 to the pressure required for its forward feed and molding. In zone 2 the pressure is converted into speed, and in zone 3, after it has filled up the molding cavity provided therein, the material is under static pressure. Some materials require a smaller pressure for being made plastic than for being molded. If the whole pressure were applied immediately in the first zone, the material might be caused to run before it had absorbed the heat necessary for being rendered properly plastic. In this case the material would enter zone 2 in an unsatisfactory condition from a thermal point of view. In order to avoid this the piston 5 is under the control of a resilient member 6; for instance a spring, or a hydraulic or pneumatic buffer which is secured to an upper press plate 7. If the full pressure is now applied to the plate 7 in order to move the piston 5 downwards, the piston will come against the material in the supply zone, but, during the time the pressure plate 7 traverses the distances, the piston can act only with a pressure which corresponds to the adjustment of the spring 6. The latter adjustment may be effected by means of screws (not shown). The full pressure will start to be exerted as soon as the pins 8 secured to the pressure plate 7 come against the piston 5.

If the spring has been properly adjusted no further intermediate operation will be necessary, since the material has sufficient time to absorb the heat necessary for its being rendered plastic without being caused to run prematurely by excessive pressure.

The zone 2 consisting of a number of parts constitutes the transition from the supply zone in which the material is rendered plastic to the molding zone. It is in the second zone that the most important processes take place, for which reason this zone requires the most attention. By completely separating the second zone from the other two, the best conditions of adjustment can be readily ensured as regards the dimensions of the passages through which the material rendered plastic flows from the zone of supply to the molding cavity, it being possible readily to effect the necessary alterations without in any way affecting the other zones. By systematically varying the ratio between the length and cross-section of the passages and, if necessary, also their actual position, the proper adjustment can be readily effected according to the material to be treated and the molding to be obtained.

Figure 3:
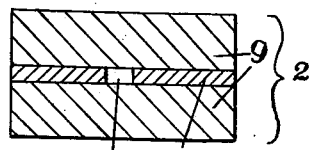
Fig. 3 is a transverse cross-section through the intermediate zone.

In Figure 3, showing in transverse cross-section the intermediate zone 2, it will be seen that the same comprises two side cheeks 9 and a middle part 10 between the cheeks provided with or leaving between its plates a longitudinal passage 10a. The position and dimensions of the passage 10a may readily be varied by removing the middle part 10 and replacing it by another middle part, or by moving its two plates relatively to one another, which would ensure that the desired physical condition will be obtained. The length of the passage 10a may also be varied by using a plurality of middle parts following one another in the longitudinal direction and by varying their number according to requirements.

Figure 4:
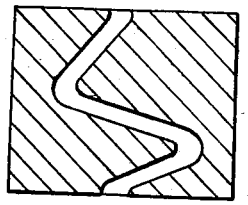
Fig. 4 is a sectional elevation through a modification of the intermediate zone.

Since the passages are arranged to lie on a dividing surface and therefore can be rendered easily accessible for cleaning purposes, any desired curved or bent form may be imparted to them, as is, for instance, shown in sectional elevation in Figure 4. This construction enables the greatest length of passage to be obtained with the shortest possible construction of intermediate zone.

Figure 5:
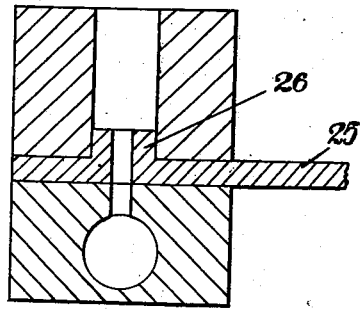
Fig. 5 is a sectional elevation of a further modification of the three zones.

It has already been pointed out above that, in order to maintain the properly adjusted physical conditions, it is necessary that there shall be no exchange of heat between the individual zones during the intimate contact caused by the running of the material. When the abutting surfaces are metallic this is impossible. The present invention overcomes this difficulty by the insertion of heat insulating means between the pressure zone and the intermediate zone, as well as between the latter and the molding zone, or between the pressing material and one of these zones. Although the means referred to are made of a heat-insulating material and the contact is not of long duration, there is nevertheless an absorption of heat which, when the contact is often repeated, may increase to such an extent that the material no longer acts as an insulation. For this reason according to the invention the heat-insulating means is made displaceable, and, during the periods when no molding is effected therein, that is to say, when the zones have been separated from one another after each molding operation, the heat-insulating portion which had been used is displaced and replaced by a fresh portion thereof. Two different forms of construction of such displaceable insulating means are illustrated in Figures 1 and 2. According to one form of construction the heat-insulating means is, for instance, in the form of a sheave 15 provided with a circular row of holes 21 corresponding to the position of the central passages in the different zones 1, 2 and 3. The sheave 15 is attached to a spindle 17 through the intermediary of a bushing 16. After each molding operation, and after the zone 1 has been withdrawn, the sheave 15 is rotated through the required angle and a new portion thereof comes to lie between the zones for the next operation. However, it is not absolutely necessary to effect this change after each operation, it being sufficient to do so when one of the sectors of the sheave 15 become inadmissibly hot, or has become greatly worn. According to the second form of construction, also shown in Figure 1 for the separation of the zone 2 from zone 3, the heat insulating parts are constructed as links of a chain 18, fed forward by means of a drum 19. In this way it is possible to use one single chain for dealing with two points of insulation. For this purpose use is made of an endless chain running in one direction past an insulating point, then over a drum, and back again in the opposite direction past the second insulating point, being then carried over a second drum to pass again past the first insulating point. The sheave 15 and the chain 18 may be operated mechanically and be automatically controlled in dependence upon the movements of the other parts of the apparatus. A further form of construction of the heat-insulating element is shown in Figure 5, wherein the heat-insulating element constitutes at the same time the intermediate zone. In this form of construction the plate 25 of insulating material is provided with projections 26 arranged to project into one of the other zones, more particularly the supply zone, forming at the same time the bottom thereof. It will be seen that the material to be molded comes in direct contact with the heat-insulating element. The projections 26 are made so long that the maximum length of running passage is obtained, so that it may be subsequently shortened should it be necessary to do so in order to obtain the required physical condition for the material.

As regards the contact surfaces between the supply zone, intermediate zone and molding zone, or between the intermediate heat-separating elements and the said zones, according to the invention the construction is such that, in spite of the small surfaces where a tight fitting is to be maintained, there shall be no overloading of the contact surfaces, even in the case of large pressures, and that any back pressure that may be exerted on the surfaces, because of the contacts being no longer tight, shall be within a predetermined limit. This form of construction is also illustrated in Figures 1 and 2. The contact surfaces are shown to be provided with an annular passage 20, which is so subdivided that there is produced a surface 22 making a tight joint and surrounding the central running passage 21 and a pressure surface 24, which is further subdivided by radial passages 23. The pressure surface 24 may be made of such large dimensions, as compared with the preferably small surface 22, where a tight joint is effected, that it takes up the largest portion of the total pressure without an admissibly specific surface pressure being exceeded. When, owing to the surface 22 no longer making a tight joint, the material comes to lie under these surfaces, there is first of all only a limited contact surface, so that the lifting power is also limited and can be determined in advance; the lifting power can only reach a maximum equal to the product of the specific pressure of the material which has penetrated therein, multiplied by the size of the surface 22 intended to make a tight joint. The material escaping beyond this surface cannot exert a back pressure since, without encountering any resistance, it reaches the annular passage 20 and, after filling the same, also without encountering any resistance and having no pressure, it escapes outside the apparatus through the radial passages 23, between the pressure surfaces. By constructing the contact surfaces in the manner referred to, it is possible to keep the specific surface pressure so small that also the sensitive insulating materials of the heat insulating elements are not detrimentally affected. The surfaces making the tight joint and the pressure surfaces may be made also of other shapes, for instance, conical, spherical or cylindrical.

I wish it to be understood that the details for carrying the invention into effect may be modified without in any way departing from the spirit of the invention.

What I claim is:

1. An apparatus for injection molding of synthetic, more particularly of thermo-setting synthetic, materials, comprising a part having a supply chamber in which the material is placed and rendered plastic and which terminates in an injection opening, a part having a molding cavity and an opening for the admission of the material to the said cavity, and a removable intermediate part which will enable the physical conditions of the material passing from the supply part to the molding part to be varied, which intermediate part is entirely separate from the supply and molding parts and is interposed between them and has a passage through which the material passes from the supply to the molding part in combination with the heat-insulating means between the intermediate and the supply and moulding parts, the said heat-insulating means being readily displaceable and having a series of passages capable of being successively brought into register with the injection opening in the supply part and the inlet opening in the part provided with the molding cavity, and means for displacing the heat-insulating means in order to interpose fresh portions thereof between the intermediate and the supply and molding parts and to effect the said register.

2. An apparatus as claimed in claim 1, in which the intermediate part comprises two side cheeks and two plates capable of being set any desired distance apart from each other between the said cheeks, whereby a longitudinal passage of desired width is left between each other.

3. An apparatus as claimed in claim 1, in which the passage in the intermediate part is curvilinear, whereby a maximum length of passage with a minimum height of the intermediate part can be obtained.

4. An apparatus as claimed in claim 1, and in which the heat-insulating means consist of a rotating sheave in which the said series of passages is arranged in a circular row.

5. An apparatus as claimed in claim 1, in which the heat-insulating means consist of an endless chain capable of being moved, each link of the chain containing one of the said passages.

6. An apparatus as claimed in claim 1, and in which the surfaces of the supply, molding and intermediate parts abutting against the heat-insulating means are divided into a contact surface forming a tight joint immediately around the openings, holes and passages through which the material passes from one part into the other, and another contact surface substantially larger than the first contact surface and serving to take up the pressures, the two contact surfaces having a circular recess separating them and the second contact surface having passages leading from the said annular recess to the outside of the apparatus, for the purpose of ensuring that in the event of the first contact surface failing in making a tight joint, the material will not come under the second contact surface but escape outside the apparatus.

7. An apparatus for injection molding of synthetic, more particularly of thermo-setting synthetic, materials, comprising a part having a supply chamber in which the material is placed and rendered plastic, a part having a molding cavity and an inlet opening, for the admission of the material to the said cavity, and an intermediate part consisting of a plate of heat-insulating material and having a series of projecting extensions with passages therein capable of being inserted into the supply chamber to form the bottom thereof with the passage therein registering with the inlet opening of the part containing the molding cavity, each of the said passages having a maximum length which can be subsequently shortened by reducing the length of the said extension according to the material which is treated, and means for displacing the said intermediate part of heat-insulating material in order to bring the extensions with the passages therein successively into the supply chamber and into the proper position with respect to the inlet opening to the molding cavity.

ALFONSO AMIGO.